(12) United States Patent
Belser et al.

(10) Patent No.: US 9,508,090 B1
(45) Date of Patent: Nov. 29, 2016

(54) END USER PARTICIPATION IN MOBILE ADVERTISEMENT

(71) Applicant: Sprint Communications Company L.P., Overland Park, KS (US)

(72) Inventors: John E. Belser, Olathe, KS (US); Do Kyu Lee, Overland Park, KS (US); Hannah J. Sifuentes, Lee's Summit, MO (US); Anurag Thantharate, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/494,601

(22) Filed: Sep. 24, 2014

(51) Int. Cl.
*G06Q 30/00* (2012.01)
*G06Q 30/02* (2012.01)

(52) U.S. Cl.
CPC ...... *G06Q 30/0257* (2013.01); *G06Q 30/0271* (2013.01); *G06Q 30/0273* (2013.01); *G06Q 30/0276* (2013.01)

(58) Field of Classification Search
CPC .................................................. G06Q 30/0257
See application file for complete search history.

(56) References Cited

U.S. PATENT DOCUMENTS

| | | |
|---|---|---|
| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |
| 5,933,811 A | 8/1999 | Angles et al. |
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |

(Continued)

FOREIGN PATENT DOCUMENTS

| | | |
|---|---|---|
| WO | WO03044703 A1 | 5/2003 |
| WO | WO2012093396 A1 | 7/2012 |
| WO | 2015038562 A1 | 3/2015 |

OTHER PUBLICATIONS

Weaver, Farni, et al., "Method and System for Facilitating Determination of Call-Drop Locations in a Wireless Network," filed Sep. 9, 2003, U.S. Appl. No. 10/658,353.

(Continued)

*Primary Examiner* — Scott C Anderson

(57) ABSTRACT

Embodiments of the disclosure are directed to methods and systems for customizing advertising content for use on a mobile communication device. A user may be allowed to customize the advertisement content that is presented on their device. This may be accomplished by monitoring the advertisement activity on the mobile device and then allowing the user to customize advertisements from that monitored activity. The functionality may be provided by a customization application executed by the device, individual communication applications executed by the device, and/or an ad gateway in communication with the device.

20 Claims, 7 Drawing Sheets

(56) References Cited

U.S. PATENT DOCUMENTS

| | | |
|---|---|---|
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,801,518 B1 | 9/2010 | Urbanek |
| 7,840,498 B2 | 11/2010 | Frank et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 * | 1/2013 | Mirchandani ......... G06Q 30/02 705/26.1 |
| 8,423,408 B1 | 4/2013 | Barnes et al. |
| 8,442,858 B1 | 5/2013 | Barnes et al. |
| 9,275,390 B1 | 3/2016 | Barnes et al. |
| 9,319,379 B1 | 4/2016 | Burcham et al. |
| 9,374,335 B2 | 6/2016 | Burcham et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0010137 A1 | 1/2008 | Ho et al. |
| 2008/0065476 A1 | 3/2008 | Klein et al. |
| 2008/0082412 A1 | 4/2008 | Tallyn et al. |
| 2008/0097851 A1 | 4/2008 | Bemmel et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0140476 A1 * | 6/2008 | Anand ............... G06Q 30/02 705/14.43 |
| 2008/0147478 A1 | 6/2008 | Mall et al. |
| 2008/0228583 A1 | 9/2008 | MacDonald et al. |
| 2009/0029721 A1 | 1/2009 | Doraswamy |
| 2009/0048977 A1 | 2/2009 | Aggarwal et al. |
| 2009/0070129 A1 | 3/2009 | Inbar et al. |
| 2009/0076899 A1 | 3/2009 | Gbodimowo |
| 2009/0150215 A1 | 6/2009 | Kalb et al. |
| 2009/0157512 A1 | 6/2009 | King |
| 2009/0198580 A1 | 8/2009 | Broberg et al. |
| 2009/0222329 A1 | 9/2009 | Ramer et al. |
| 2009/0256858 A1 | 10/2009 | Ogikubo et al. |
| 2009/0265245 A1 | 10/2009 | Wright |
| 2009/0271255 A1 | 10/2009 | Utter et al. |
| 2009/0292608 A1 | 11/2009 | Polachek |
| 2010/0082422 A1 | 4/2010 | Heilig et al. |
| 2010/0082429 A1 | 4/2010 | Samdadiya et al. |
| 2010/0119111 A1 | 5/2010 | Helfman et al. |
| 2010/0222035 A1 | 9/2010 | Robertson et al. |
| 2011/0082939 A1 | 4/2011 | Montemurro et al. |
| 2011/0131109 A1 | 6/2011 | Pappas et al. |
| 2011/0246890 A1 * | 10/2011 | Mellamphy ........... H04L 51/38 715/719 |
| 2011/0258049 A1 | 10/2011 | Ramer et al. |
| 2011/0270687 A1 | 11/2011 | Bazaz |
| 2012/0072271 A1 | 3/2012 | Dessert et al. |
| 2012/0123830 A1 * | 5/2012 | Svendsen ......... G06Q 30/0252 705/14.5 |

(56) References Cited

U.S. PATENT DOCUMENTS

| | | |
|---|---|---|
| 2012/0170521 A1 | 7/2012 | Vogedes et al. |
| 2012/0179536 A1 | 7/2012 | Kalb et al. |
| 2013/0018714 A1* | 1/2013 | George .............. G06Q 30/0277 705/14.16 |
| 2013/0211925 A1* | 8/2013 | Holland .............. G06Q 30/0241 705/14.72 |
| 2013/0211941 A1 | 8/2013 | Hallowell et al. |
| 2013/0304586 A1 | 11/2013 | Angles et al. |
| 2013/0331027 A1 | 12/2013 | Rose et al. |
| 2014/0059141 A1 | 2/2014 | Belkin et al. |
| 2014/0080467 A1 | 3/2014 | Urbanek |
| 2014/0089113 A1 | 3/2014 | Desai et al. |
| 2014/0278953 A1 | 9/2014 | Ismail et al. |
| 2015/0074204 A1 | 3/2015 | Burcham et al. |
| 2015/0121418 A1 | 4/2015 | Jain et al. |

OTHER PUBLICATIONS

Burcham, Robert H., et al., entitled "System and Method for Identifying a Mobile Device with Near Real Time Visualization to Action," filed Sep. 11, 2013, U.S. Appl. No. 14/024,627.

Burcham, Robert H., et al., entitled "Methods and Systems of Generating a Unique Mobile Device Identifier," filed Aug. 1, 2013, U.S. Appl. No. 13/956,367.

Holmes, Geoffrey A., entitled "Methods and Systems of Collecting and Segmenting Device Sensor Data for Mobile Device Identification," filed Jun. 5, 2013, U.S. Appl. No. 13/911,074.

Belser, John E., et al., entitled "Ad Management Using Ads Cached on a Mobile Electronic Device," filed Jan. 9, 2014, U.S. Appl. No. 14/150,832.

Burcham, Robert H., et al., entitled "IP Address Hashing in Advertisement Gateway," filed Jan. 21, 2014, U.S. Appl. No. 14/160,196

Burcham, Robert H., et al., entitled "Client Mediation and Integration to Advertisement Gateway," filed Jan. 21, 2014, U.S. Appl. No. 14/160,206.

Burcham, Robert H., et al., entitled "Address Modification for Advertisement Mediation," filed Jan. 21, 2014, U.S. Appl. No. 14/160,215.

Burcham, Robert H., et al., entitled "Advertisement Mediation of Supply-Demand Communications," filed Jan. 21, 2014, U.S. Appl. No. 14/160,224.

Katzer, Robin D., et al., entitled "Advertisement Dynamic Queue Management," filed Apr. 10, 2014, U.S. Appl. No. 14/250,381.

Burcham, Robert H., et al., entitled "Categorization of Unknown Variables in a Target Information Database," filed Nov. 4, 2014, U.S. Appl. No. 14/532,969.

Bell, Timothy L., et al., entitled "Method for Consumer Profile Consolidation Using Mobile Network Identification," filed Oct. 20, 2014, U.S. Appl. No. 14/518,504.

Arivukkarasu, Anand, et al., entitled "Telecom Services to Support Retail Fuel Stocking Logistics," filed Nov. 12, 2014, U.S. Appl. No. 14/539,715.

Delker, Jason R., et al., entitled, "Enhanced Dialer for a Mobile Communication Device," filed Mar. 4, 2015, U.S. Appl. No. 14/639,057.

Ferrante, Piero D., et al., entitled, "System and Method for Subscriber Cluster Synthesis," filed Feb. 11, 2015, U.S. Appl. No. 14/619,689.

Advisory Action dated Oct. 29, 2015, U.S. Appl. No. 11/474,880, filed Jun. 26, 2006.

Supplemental Advisory Action dated Nov. 2, 2015, U.S. Appl. No. 11/474,880, filed Jun. 26, 2006.

Advisory Action date May 18, 2015, U.S. Appl. No. 11/557,939, filed Nov. 8, 2006.

Office Action date Dec. 17, 2015, U.S. Appl. No. 11/557,939, filed Nov. 8, 2006.

FAIPP Pre-Interview Communication dated Nov. 18, 2015, U.S. Appl. No. 14/024,629, filed Sep. 11, 2013.

Notice of Allowance dated Dec. 16, 2015, U.S. Appl. No. 13/956,367, filed Aug. 1, 2013.

Final Office Action dated Oct. 29, 2015, U.S. Appl. No. 14/150,832, filed Jan. 9, 2014.

Advisory Action dated Jan. 7, 2016, U.S. Appl. No. 14/150,832, filed Jan. 9, 2014.

Notice of Allowance dated Jan. 28, 2016, U.S. Appl. No. 14/024,629, filed Sep. 11, 2013.

FAIPP Pre-Interview Communication dated Apr. 15, 2016, U.S. Appl. No. 13/911,074, filed Jun. 5, 2013.

FAIPP Pre-Interview Communication dated Feb. 16, 2016, U.S. Appl. No. 14/245,822, filed Apr. 4, 2014.

Foreign Communication from a Related Counterpart—Preliminary Report on Patentability dated Mar. 24, 2016, PCT/US14/54877, filed on Sep. 10, 2014.

Hannebaum, Ryan K., et al., entitled, "Advertisement Campaign Target Selection Engine," filed Apr. 4, 2014, U.S. Appl. No. 14/245,822.

Office Action—Restriction requirement dated Jun. 17, 2008, U.S. Appl. No. 11/405,195, filed Apr. 17, 2006, 7 pages.

Office Action dated Aug. 15, 2008, U.S. Appl. No. 11/405,195, filed Apr. 17 2006, 12 pages.

Final Office Action dated Feb. 26, 2009, U.S. Appl. No. 11/405,195, 17 pages.

Advisory Action dated May 7, 2009, U.S. Appl. No. 11/405,195, 2 pages.

Office Action dated Aug. 18, 2009, U.S. Appl. No. 11/405,195, 17 pages.

Final Office Action dated Oct. 27, 2010, U.S. Appl. No. 11/405,195, filed Apr. 17, 2006.

Office Action dated Feb. 8, 2011, U.S. Appl. No. 11/405,195, filed Apr. 17, 2006.

Final Office Action dated Jul. 22, 2011, U.S. Appl. No. 11/405,195, filed Apr. 17, 2006.

Office Action dated Apr. 6, 2012, U.S. Appl. No. 11/405,195, filed Apr. 17, 2006.

Notice of Allowance dated Dec. 6, 2012, U.S. Appl. No. 11/405,195, filed Apr. 17, 2006.

Office Action dated Feb. 27, 2009, U.S. Appl. No. 11/433,301, filed May 12, 2006, 13 pages.

Notice of Allowance dated Oct. 26, 2009, U.S. Appl. No. 11/433,301, filed May 12, 2006, 7 pages.

Office Action dated Jun. 17, 2008, U.S. Appl. No. 11/403,614, filed Apr. 13, 2006, 7 pages.

Office Action dated Aug. 27, 2008, U.S. Appl. No. 11/403,614, filed Apr. 13, 2006, 11 pages.

Final Office Action dated Mar. 4, 2009, U.S. Appl. No. 11/403,614, filed Apr. 13, 2006, 12 pages.

Advisory Action dated May 7, 2009, U.S. Appl. No. 11/403,614, filed Apr. 13, 2006, 3 pages.

Office Action dated Aug. 20, 2009, U.S. Appl. No. 11/403,614, filed Apr. 13, 2006, 11 pages.

Final Office Action dated Nov. 8, 2010, U.S. Appl. No. 11/403,614, filed Apr. 13, 2006.

Office Action dated Dec. 3, 2012, U.S. Appl. No. 11/403,614, filed Apr. 13, 2006.

Final Office Action dated Jun. 10, 2013, U.S. Appl. No. 11/403,614, filed Apr. 13, 2006.

Advisory Action dated Aug. 22, 2013, U.S. Appl. No. 11/403,614, filed Apr. 13, 2006.

Office Action dated Nov. 3, 2008, U.S. Appl. No. 11/438,540, filed May 22, 2006, 14 pages.

Final Office Action dated Apr. 28, 2009, U.S. Appl. No. 11/438,540, filed May 22, 2006, 16 pages.

Advisory Action dated Jul. 10, 2009, U.S. Appl. No. 11/438,540, filed May 22, 2006, 3 pages.

Office Action dated Oct. 16, 2009, U.S. Appl. No. 11/438,540, filed May 22, 2006, 12 pages.

Final Office Action dated Apr. 20, 2010, U.S. Appl. No. 11/438,540, filed May 22, 2006, 26 pages.

Advisory Action dated Jul. 2,10, U.S. Appl. No. 11/438,540, filed May 22, 2006, 4 pages.

(56) References Cited

OTHER PUBLICATIONS

Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiners Answer dated Oct. 27, 2011, U.S. Appl. No. 11/438,540, filed May 22, 2006.
Decision on Appeal dated Apr. 28, 2015, U.S. Appl. No. 11/438,540, filed May 22, 2006.
Notice of Allowance dated Jul. 16, 2015, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 25, 2015, U.S. Appl. No. 11/474,880, filed Jun. 26, 2006.
Final Office Action dated Aug. 31, 2015, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiners Answer date Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action date Aug. 5, 2014, U.S. Appl. No. 11/557,939, filed Nov. 8, 2006.
Final Office Action date Mar. 2, 2015, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 11, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Examiners Answer dated Mar. 12, 2015, U.S. Appl. No. 12/259,187, filed Oct. 27, 2008.
FAIPP Pre-Interview Communication dated Sep. 23, 2015, U.S. Appl. No. 13/956,367, filed Aug. 1, 2013.
FAIPP Pre-Interview Communication dated Apr. 3, 2015, U.S. Appl. No. 14/150,832, filed Jan. 9, 2014.
FAIPP Office Action dated Jul. 2, 2015, U.S. Appl. No. 14/150,832, filed Jan. 9, 2014.
Lightningcast, Inc., "Lightningcast Mobile Video Advertising Solution," May 2, 2005, 14 pgs.
Kurawarwala, Abbas A., et al., "Forecasting and Inventory Management of Short Life-Cycle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Thierer, et al., "Privacy Solutions (Part 2): Adblock Plus," Technology Liberation Front, Sep. 8, 2008, on line at tech liberation.com.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.

(56) References Cited

OTHER PUBLICATIONS

Barnes, James D., et al., entitled "Mobile-Device-Based Coupon Management Systems and Methods," filed Apr. 13, 2006, U.S. Appl. No. 11/403,614.

Barnes, James D., et al., entitled, "Inventory Management Intergrating Subscriber and Targeting Data," Jun. 26, 2006, U.S. Appl. No. 11/474,880.

Barnes, James D., et al., entitled, "Behavioral Analysis Engine for Profiling Wireless Sunscribers," filed Nov. 8, 2006, U.S. Appl. No. 11/557,939.

Barnes, James D., et al., entitled, "Advertisement Inventory Management," filed Oct. 27, 2008, U.S. Appl. No. 12/259,187.

Martin, Geoff S., et al., entitled, "Method and System for Providing Custom Background-Downloads," filed Nov. 16, 2007, U.S. Appl. No. 11/280,576.

McConnell, Von K. et al., entitled, "Method and System Using Location History for Targeted Coupon Distribution," filed May 17, 2000, U.S. Appl. No. 09/572,282.

Final Office Action dated May 3, 2016, U.S. Appl. No. 11/557,939, filed on Nov. 8, 2006.

Restriction Requirement dated May 19, 2016, U.S. Appl. No. 14/024,627, filed Sep. 11, 2013.

Office Action dated May 17, 2016, U.S. Appl. No. 14/150,832, filed on Jan. 9, 2014.

First Action Interview Office Action dated Apr. 28, 2016, U.S. Appl. No. 14/245,822, filed Apr. 4, 2014.

\* cited by examiner

US 9,508,090 B1

END USER PARTICIPATION IN MOBILE ADVERTISEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising content may be presented to users of mobile communication devices when the users employ functions of the device such as internet access, gaming, or other sponsored applications. Devices capable of displaying this sort of advertising content may include mobile phones, portable digital assistants, tablets, laptop computers, and other devices. The advertising content may include videos, still images, links to offers or discounts at a particular vendor, or to a chain or subsidiary of a particular vendor. The advertisements may vary based on the type and size of the advertisement that can be inserted into the content.

SUMMARY

In an embodiment, a method for customizing an advertisement experience on a mobile communication device is disclosed. The method comprises: automatically monitoring advertisement activity on a mobile device, wherein advertisement activity is provided by an advertisement gateway in communication with the mobile communication device; providing customization options to a user for customizing future advertisement content on the mobile communication device, wherein the customization options comprise replacing at least a portion of the advertisement content with personal content locally stored on the mobile communication device; receiving customizations input by a user; associating the customizations with a particular advertisement from the monitored advertisement activity; and applying the customizations to future advertisement content received to the mobile communication device, wherein personal content comprises images, videos, sounds, or other media.

In an embodiment, a method for customizing an advertisement experience on a mobile communication device is disclosed. The method comprises: monitoring advertisement content presented on a first mobile communication device within an application executed on the device, wherein the advertisement content is sent to the mobile communication device from an advertisement gateway; providing options to a user for customizing future advertisements in the application, wherein the options comprise content stored by the advertisement gateway that has been uploaded to the advertisement gateway by a second mobile communication device; receiving customizations input from a user, wherein each customization is associated with a particular advertisement identifier, and each customization is chosen from the options provided; associating the customizations with the particular advertisement identifier from the monitored advertisement content; and applying the customizations to future advertisement content presented by the mobile communication device within the application.

In an embodiment, a mobile communication device is disclosed. The mobile device comprises, a memory, a processor; and an application stored in the memory that, when executed by the processor, monitors advertisement activity on the mobile communication device, wherein advertisement activity is provided by an advertisement gateway in communication with the mobile communication device; provides customization options to a user for customizing future advertisement content on the mobile communication device; receives customizations input from a user; associates the customizations with a particular advertisement from the monitored advertisement activity; and applies the customizations to future advertisement content received to the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
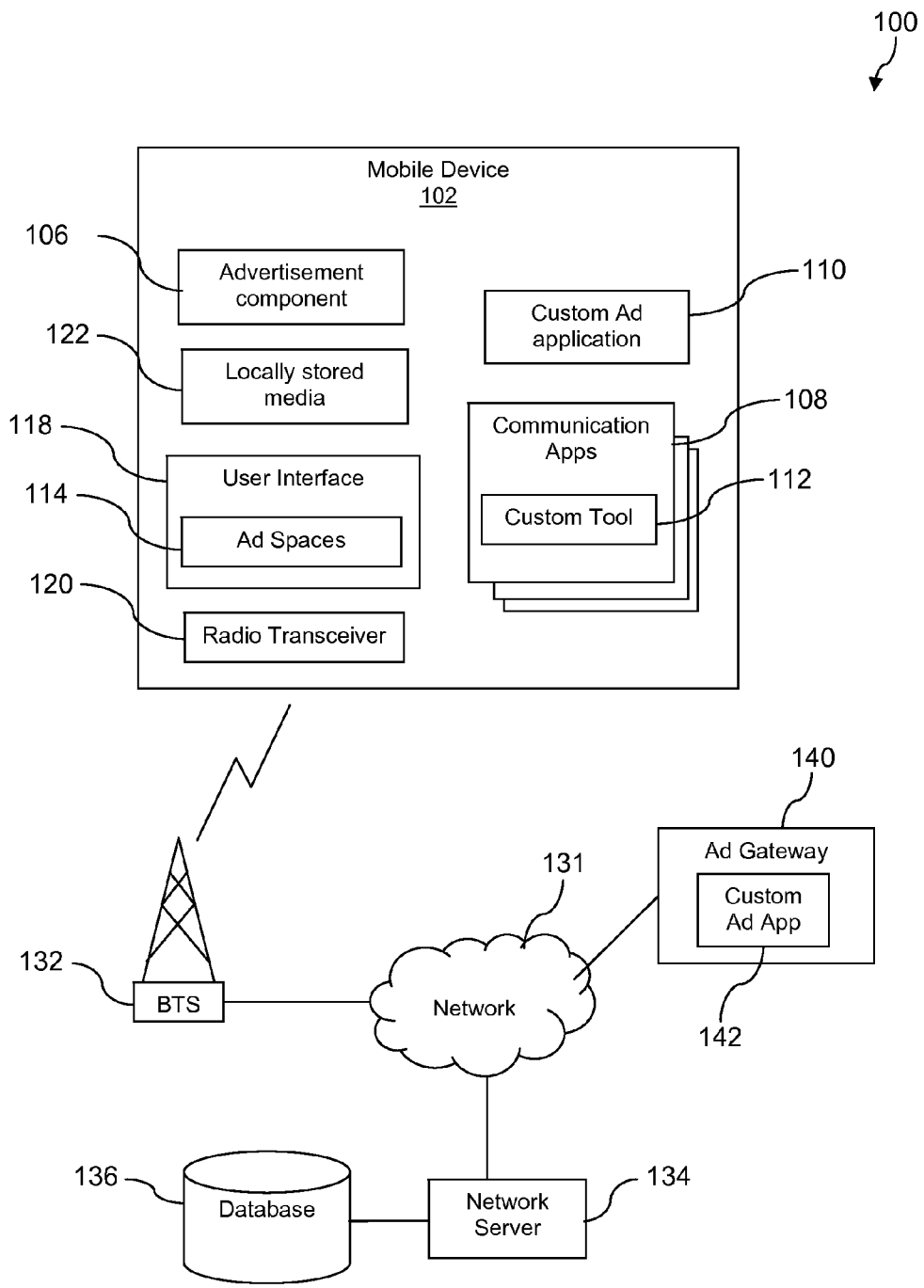
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for customizing advertising content for use on a mobile communication device. The user interface of a mobile communication device may comprise advertisement spaces that are available for presenting advertisement content. In some cases, the advertisement spaces may be located within a graphical user interface (GUI) of a communication application executed on the device.

In some cases, it may be desirable to allow a user to customize the advertisement content that is presented on his or her device. For example, personal content, such as images, video, audio, etc. may be used to replace at least part of an advertisement that may be presented on the device. If personal images are used in the advertisements on the device, a user may be more likely to look at the ads, more likely to enjoy the advertisement experience, and less likely to be unhappy about the advertisement taking up space on the user interface of the device. For example, if a user sees an advertisement for a travel company or vacation related company, a user may wish to associate a personal photo of his or her family on vacation with future advertisements from that company or type of company.

This may be accomplished by monitoring the advertisement activity on the mobile device and then allowing the user to customize advertisements from that monitored activity. Personal content may be uploaded to a content data store from the mobile device to be used for a specific ad or type of ad, and the uploaded content may be associated with an identifier for that specific ad or type of ad. In some embodiments, the content data store may be maintained and/or controlled by an ad gateway. The functionality may be provided by a customization application executed by the device, which may handle customizing advertisements for a plurality of communication applications. In other cases, the individual communication applications may provide this functionality via the settings or a customization tool within each of the applications. In still other cases, the ad gateway in communication with the mobile device may provide an interface for a user to choose customization options, and then may facilitate the implementation of those choices.

In some cases, the uploaded content may be used by an ad provider for other advertisement purposes, for example, presenting an ad with the content uploaded by a first user in a user interface of an application executed on a second mobile communication device to a second user. This may broaden the resources for the ad provider for a particular ad or type of ad. The ad provider may also form a gallery of uploaded user images from a plurality of users which may be accessed by a user, who may then choose customization options from the gallery. Additionally, a user may be reimbursed and/or recognized for any personal content that is used by the ad provider and/or other users. In some cases, a user might earn rewards or credits with the ad provider and/or service provider when their personal content is uploaded, used, shared, and possibly voted on by other users.

The uploaded content may be associated with an ad identification at the time of uploading. A plurality of different ad content (e.g., photographs or digital images associated with the ad content, for example a picture of a late model car with a family having fun in the mountains, a picture of the same late model car with a different family having fun at the beach) may be uploaded independently by different subscribers each associated with the same advertisement, for example each associated with the same ad identification. When the second mobile communication device requests an ad, a textual component of an ad for the model of car may be selected and one of the plurality of uploaded content may be selected to fill into the ad based on a profile of the user. For example, a first user profile may indicate the user enjoys mountain recreation activities, and the ad may be filled with the photograph of the car with a family having fun in the mountains. A second user profile may indicate the user enjoys visiting the beach and the ad may be filled with the photograph of the car with a family having fun at the beach.

Turning now to FIG. 1, a communication system 100 is described. In an embodiment, the communication system 100 comprises a mobile communication device 102 comprising a cellular radio transceiver 120, a user interface 118 and a plurality of communication applications 108 executed by the mobile device 102. The mobile communication device 102 may engage in a variety of communication exchanges. The mobile communication device 102 may be a mobile phone, a personal digital assistant (PDA), a media player, a laptop computer, a tablet computer, a notebook computer, a wearable computer, a headset computer, or another electronic device having a cellular radio transceiver.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile device 102 may couple to the network 131 by a variety of communication paths. The mobile device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. In some embodiments, the mobile device 102 may communicate with the base transceiver station (BTS) 132 via the cellular radio transceiver 120 of the mobile device 102. The wireless link between the mobile device 102 and the base transceiver station 132 may couple the mobile device 102 to the network 131. Additionally, the base transceiver station 132 may also be known as a cell tower. In other embodiments, the mobile device 102 may communicate with the network 131 via a short-range wireless communication link to a wireless access point, for example via a WiFi or a Bluetooth wireless access point.

It is understood that the system 100 may comprise any number of mobile devices 102 and any number of base transceiver stations 132. The collectivity of base transceiver stations 132 may be said to comprise a radio access network, in that these base transceiver stations 132 may provide radio communication links to the mobile communication devices 102 to provide access to the network 131. The radio access network may be abstracted in different ways and may comprise, in addition to the base transceiver stations 132, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile devices 102. In some embodiments, the network 131 may provide communication between the mobile communication device 102 and a network server 134, wherein the network server 134 may also communicate with a network database 136.

The communication applications 108 may comprise a voice communication application, a data communication application, a web browser application, an email application, a short message system (SMS) or texting application, a multimedia message system (MMS) application, and/or other communication applications. The communication applications 108 may also comprise game applications, social media applications, social network applications, productivity applications, utility applications, shopping applications, news applications, streaming media applications, finance applications, and any other applications which may be used on a mobile communication device 102. The communication applications 108 may be standard communication applications that are delivered by an original equipment manufacturer (OEM) who assembles the mobile device 102. The communication applications 108 may also be downloaded by a user to the mobile device 102 during the use of the mobile device 102. The communication applications 108 may be stored as firmware or software in a memory of the mobile device 102. The communication applications 108 may expose application programming interfaces (APIs) accessible to other applications to provide wireless communication functionality to the other applications.

One of the communication applications 108 may be a telephone application that receives dialed digits and attempts to originate a voice call—for example a voice over IP (VoIP) call—to a called telephone. One of the communication applications 108 may be a web browser application that requests content from the network 131, for example by sending out a hypertext transport protocol (HTTP) message embedding a universal reference locator (URL). One of the communication applications 108 may be a media player that requests streaming or downloading media from the network 131. Many of the communication applications 108 may depend upon communication service provided by an IMS network to deliver their functionality to an end user of the mobile device 102. One of the communication applications 108 may comprise a mobile transaction interface, where a user may complete a purchase using the application, and secure information, such as credit card information, may be communicated through the application. In some embodiments, the communication applications 108 may be stored in a system memory partition of the memory of the mobile device 102.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, ring tones or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of one or more of the communication applications 108. Additionally, a user may receive communication from the mobile device 102 via the user interface 118, such as phone calls, text messages, messages, emails, contact information, caller identification, call history, internet access, etc. A user may additionally employ the user interface 118 for viewing and/or listening to media such as music, movies, shows, videos, photos, games etc. Additionally, the user interface 118 may comprise advertisement spaces 114 that may be operable to present advertisement data or content to a user via portions of the user interface 118, such as when a user is operating a communication application 108 on the device 102.

In some embodiments, the mobile device 102 may comprise an advertisement component 106 which may be operable to access brand information associated with the mobile device 102, as well as device information. This information may include the existing advertisement spaces 114 within the user interface 118 and which advertisement spaces 114 are allowed to be accessed. For example, a first brand may permit use of an area of the display for advertisements, while a second brand forbids use of that same area of the display, but may permit use of a different area of the display. Additionally, details of the advertisement spaces 114, such as size, format, duration, etc., may be known by the advertisement component 106. Other policies and restrictions associated with (or imposed by) the brand or device information may also be known by the advertisement component 106. For example, some brands and/or devices may have content restrictions for advertisements, such as ads for alcohol, suggestive content, political content, etc., while other brands may have different restrictions. Additionally, some brands and/or devices may have restrictions on the size, number, location and/or frequency of advertisements shown on the device, and these restrictions may vary between brands and/or devices.

In some embodiments, the advertisement component 106 may facilitate the display of advertisement content that is received by the device 102 from an ad gateway 140. The ad gateway 140 may be operable to communicate advertisement content from a plurality of advertisement providers to the mobile device. In some embodiments, the advertisement component 106 may be stored and executed on the mobile device 102, while in other embodiments, the advertisement component 106 may be separate from the mobile device 102, such as on a network server 134 or database 136. In some embodiments, the advertisement component 106 may send a request for advertisement content to an ad gateway 140 to fill the advertisement spaces 114. In some embodiments, the request may comprise information about the constraints for the ad spaces.

The communication between the ad gateway 140 and the ad component 106 may be continuous or periodic over the use-life of the mobile device 102, wherein the advertisement content received by the ad component 106 from the ad gateway 140 may be updated or changed on a regular basis. In some embodiments, the ad component 106 may also be operable to place the advertisement content in the advertisement spaces 114. In some embodiments, the ad content may be requested and communicated between the ad gateway 140 and the mobile device 102 whenever the mobile device 102 executes an application with an available advertisement space, for example an ad is supplied to the mobile device 102 on demand or ad hoc. In other embodiments, a cache of advertisements may be stored on the device 102 from the ad gateway 140, wherein the cache may be periodically updated by the ad gateway 140. For example 5 ads may be requested at a time and cached, 10 ads may be requested at a time and cached, 20 ads may be requested at a time and cached, or some other number of ads may be requested at one time and then cached. In this alternative embodiment, when an ad is desired to be presented on the device 102, the ad may be fetched from the cache, thereby avoiding delay in selecting the ad by the ad gateway 140 and transmitting the subject ad over the network 131.

In some embodiments, the mobile device 102 may communicate with the ad gateway 140 via the network 131, wherein the advertisement content may be communicated to the mobile device 102 from the ad gateway 140 over the network 131. The ad gateway 140 may, in some embodiments, comprise a system for targeting ads to consumers. In some embodiments, the ad gateway 140 may control the placement of the advertisement content into the advertisement spaces 114. For example, the ad component 106 may yield temporary control to the ad gateway 140, wherein the ad gateway 140 may then have access to the advertisement spaces 114 available on the mobile device 102.

In some embodiments, the advertisement content that is communicated to the mobile device 102 from the ad gateway 140 may have one or more identifier associated with the content. For example, the content may be identified by the brand, company, or product that is being advertised. In some embodiments, the content may be identified by the type or category of advertisement, such as an automobile advertisement, a video game advertisement, a cleaning product advertisement, a restaurant advertisement, etc. These identifiers may be communicated with the advertisement content to the mobile device 102, and in some embodiments, may be stored to the mobile device 102.

An embodiment of the disclosure may comprise customizing advertisements presented by the mobile device 102 within a specific communication application 108. The advertisements may be presented in ad spaces 114 as a banner ad, a swipe screen ad, an introductory ad, a video ad, a graphic ad, or any other form of advertisement which may be presented by the mobile device 102. In one example, the advertisement may comprise a banner ad, wherein the ad appears on a portion of the screen of the user interface 118 while the specific communication application 108 is being executed. A user may wish to associate a personal photo with one or more of the advertisements presented in the banner ad space. In some embodiments, the communication application 108 may monitor the advertisement content presented in the banner ad space. The user may be able to access a list of the monitored content, and may be able to associate personal content with a specific advertisement, or type of advertisement, that appears on the list. This may be accomplished by the communication application 108 accessing the locally stored media 122 on the mobile device 102, uploading at least a portion of the locally stored media 122, and associating that uploaded media with an advertisement identifier.

In some embodiments, at least some of the communication applications 108 executed on the mobile device 102 may comprise a customization tool 112 that may provide the user of the mobile device 102 with options to customize the advertisements that are presented on the mobile device 102. For example, the customization tool 112 may allow a user to upload personal content from the mobile device 102, such as an image, video, or other graphic, which may be associated with a particular advertisement or type of advertisement when that advertisement is displayed by the communication application 108. In some embodiments, the personal content may comprise locally stored media 122 on the mobile device 102, such as photos, videos, or audio that may have been captured by the mobile device 102, for example. In another embodiment, this same functionality may be provided in the settings of the communication application 108.

In another embodiment, the mobile device 102 may comprise a custom advertisement application 110, which may provide the user of the mobile device 102 with options to customize the advertisements that are presented on the mobile device 102. The custom advertisement application 110 may be operable to monitor the identifiers associated with the advertisement content delivered to the mobile device and to report these identifiers to a user, such as in the form of a list of advertisement activity. In some embodiments, a user may access the list of advertisement activity and may be given the option to customize certain advertisements. This may be accomplished by a user choosing a particular type of advertisement from the list of advertisement activity, viewing customization options for that type of advertisement, and making a selection. Then, that customization option may be applied to future advertisements of that same type.

In yet another embodiment, the customization options may be provided by the ad gateway 140 and/or the ad providers communicating with the ad gateway 140, wherein the ad gateway 140 may comprise a custom advertisement application 142 operable to provide and facilitate the customizations. Alternatively, a separate server (not shown) may host the custom advertisement application 142. A user may be able to click the link of an advertisement and be taken to a website or other interface (possibility facilitated by the custom ad application 142) where the user may be able to upload personal content and/or choose from a selection of options from the ad provider and/or other users. Then, the ad gateway and/or ad provider may associate the chosen customizations with the advertisement content and modify all future advertisements of that type that are sent to the mobile device 102 (wherein the customizations may be handled by the custom ad application 142). In some embodiments, the uploaded or chosen content may be automatically associated with the identifier of the advertisement that was clicked by the user to get to the customization interface. In some embodiments, a user may be required to create an account with the ad provider(s) to upload content and customize advertisements.

When an ad is requested by the mobile communication device 102, the ad gateway 140 may first look up a user profile associated with the mobile device 102. An ad is selected based on the user profile, for example a targeted ad (e.g., an ad that relates to a product in which the subject user can be predicted to have an above average interest based on the demographics, history, or interests of the subject user stored in the profile). If the selected ad is associated with a plurality of uploaded content (e.g., a plurality of photographs of digital images), the ad gateway may select which uploaded content to incorporate into the selected based on the user profile, for example selecting a photograph of a family having fun in a car in the mountains versus a photograph of a family having fun in a car at the beach.

In an exemplary embodiment, a user may access a communication application 108, wherein the application comprises advertisement spaces 114. Then, if a user notices an advertisement that he or she wishes to customize, such as a car advertisement, the user may either click the advertisement or access the monitored advertisement activity. This may direct the user to either the settings or tools 112 within the communication application 108, the custom ad application 110 and/or the ad gateway 140 (via the custom ad application 142). Then, a user may choose to upload personal content, such as a personal photo that is related to the advertisement, which may be a photo of the user's personal car. The uploaded photo may then be associated with future advertisements for that make of car and/or other similar car advertisements, and presented as a replacement of at least a portion of the advertisement content, such as the background photo of the advertisement.

In some embodiments, the customization options may comprise uploading personal content, such as local stored media 122, from the mobile device 102 to at least partially replace the selected type of advertisement. For example, the custom ad application 110 may allow a user to upload personal content from the mobile device 102, such as an image, video, or other graphic, which may be associated with a particular advertisement or type of advertisement. Then, when presenting future advertisements of that type, the custom ad application 110 may access the personal content and replace at least a portion of the advertisement with the personal content.

In some embodiments, customization options may comprise a selection of options presented by the advertisement gateway 140, such as images, videos, audio, etc. In some embodiments, the ad gateway 140 may upload personal content from a plurality of users, which may then be made accessible to other users who wish to customize their advertisements. In some embodiments, the advertisement providers may provide reimbursement or recognition to the users when content uploaded from them is used by another user, or by the ad provider itself. This may broaden the resources of the ad providers for content that may be used in advertisements. Content uploaded to the ad gateway 140 may be associated with an identifier for a specific advertisement or type of advertisement, so that the provider of that advertisement may be able to access the uploaded content.

In some embodiments, social interactions may be initiated by the uploading and sharing of the personal content by the advertisement provider. For example, a user may be able to see users identifiers associated with certain images, videos, etc. that are provided by the ad provider as customization options. Also, user may be capable of voting for uploaded content that should be used by the advertiser, for example. Additionally, a user may receive feedback, rewards, credits, or other compensation if personal content is uploaded, shared, accessed by other users, voted on by other users, etc. An application may track how many times an uploaded content is voted positively for and calculate community approval scores on different uploaded content. Users providing uploaded content may be compensated based on the community approval scores tracked and calculated by the application executing on a server computer.

Figure 2:
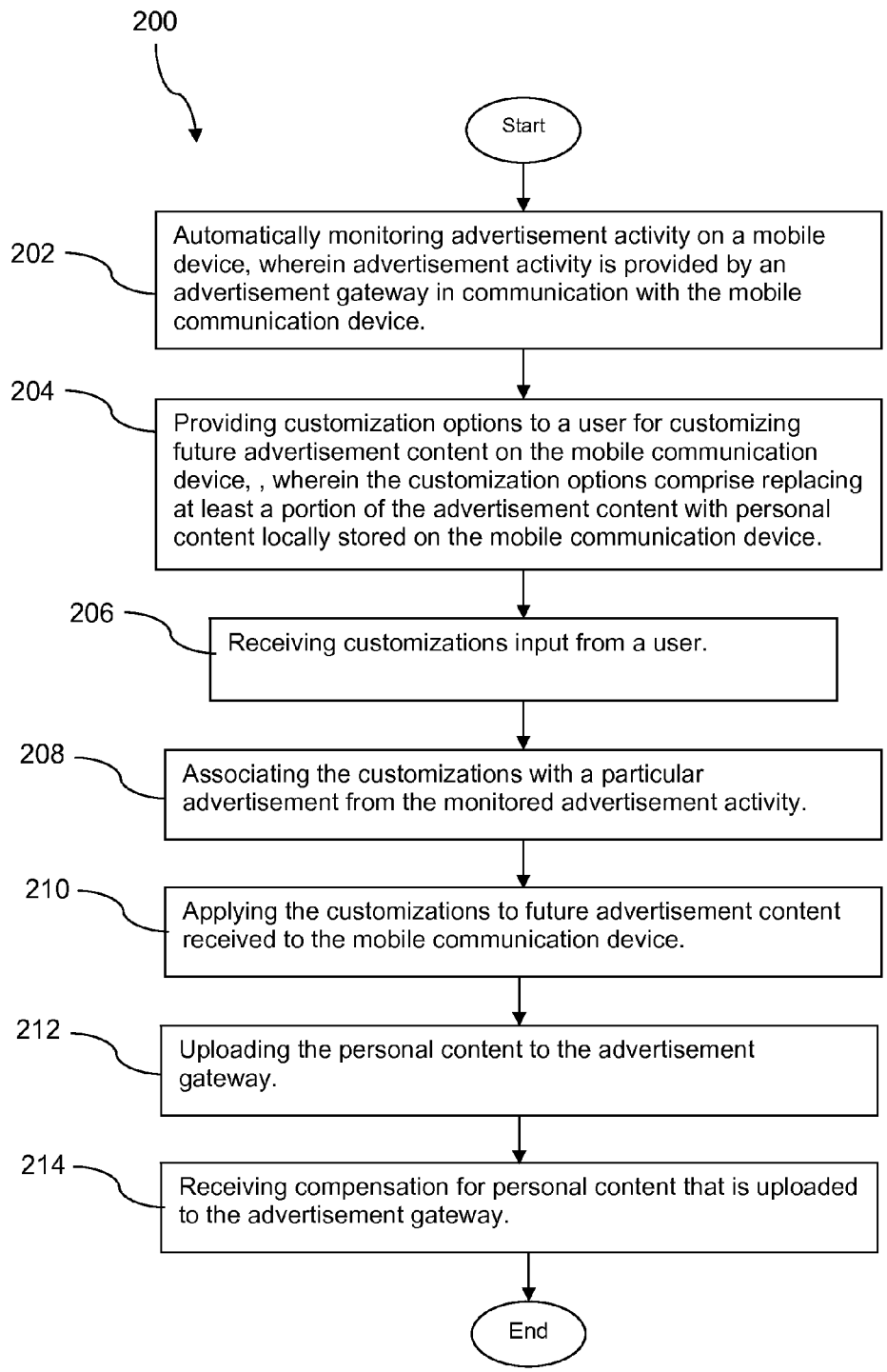
FIG. 2 is a flow chart illustrating a method according to an embodiment of the disclosure.

Turning now to FIG. 2, a method 200 for customizing an advertisement experience on a mobile communication device is described. At block 202, advertisement activity may be automatically monitored on the mobile communication device. In some embodiments, advertisement activity is provided by an advertisement gateway in communication with the mobile communication device. At block 204, customization options may be provided to a user for customizing future advertisement content on the mobile communication device, wherein the customization options may comprise replacing at least a portion of the advertisement content with personal content locally stored on the mobile communication device. At block 206, customizations input by the user may be received. At block 208, the customizations may be associated with a particular advertisement from the monitored advertisement activity. At block 210, the customizations may be applied to future advertisement content received to the mobile communication device. In some embodiments, personal content comprises images, videos, sounds, or other media.

In some embodiments, the method 200 may be completed by a customization application on the mobile device, wherein the application facilitates the distribution of advertisement content for a plurality of communication apps executed by the device. In some embodiments, the method 200 may be completed by one or more communication application on the mobile device, wherein the communication application presents advertisement content to the user. In some embodiments, the steps of the method 200 may be completed by the advertisement gateway in communication with the mobile communication device. In some embodiments, the user may access the customization options by viewing the monitored advertisement activity. In some embodiments, the user may access the customization options by clicking a specific advertisement presented on the mobile communication device. In some embodiments, the customizations may comprise choosing content from a selection provided by the advertisement gateway. In some embodiments, at step 212, the method 200 may further comprise uploading the personal content to the advertisement gateway. Additionally, in some embodiments, at step 214, the method 200 may further comprise receiving compensations for personal content that is uploaded to the advertisement gateway. Compensation may comprise rewards, credits, payments, recognition, among other things.

Figure 3:
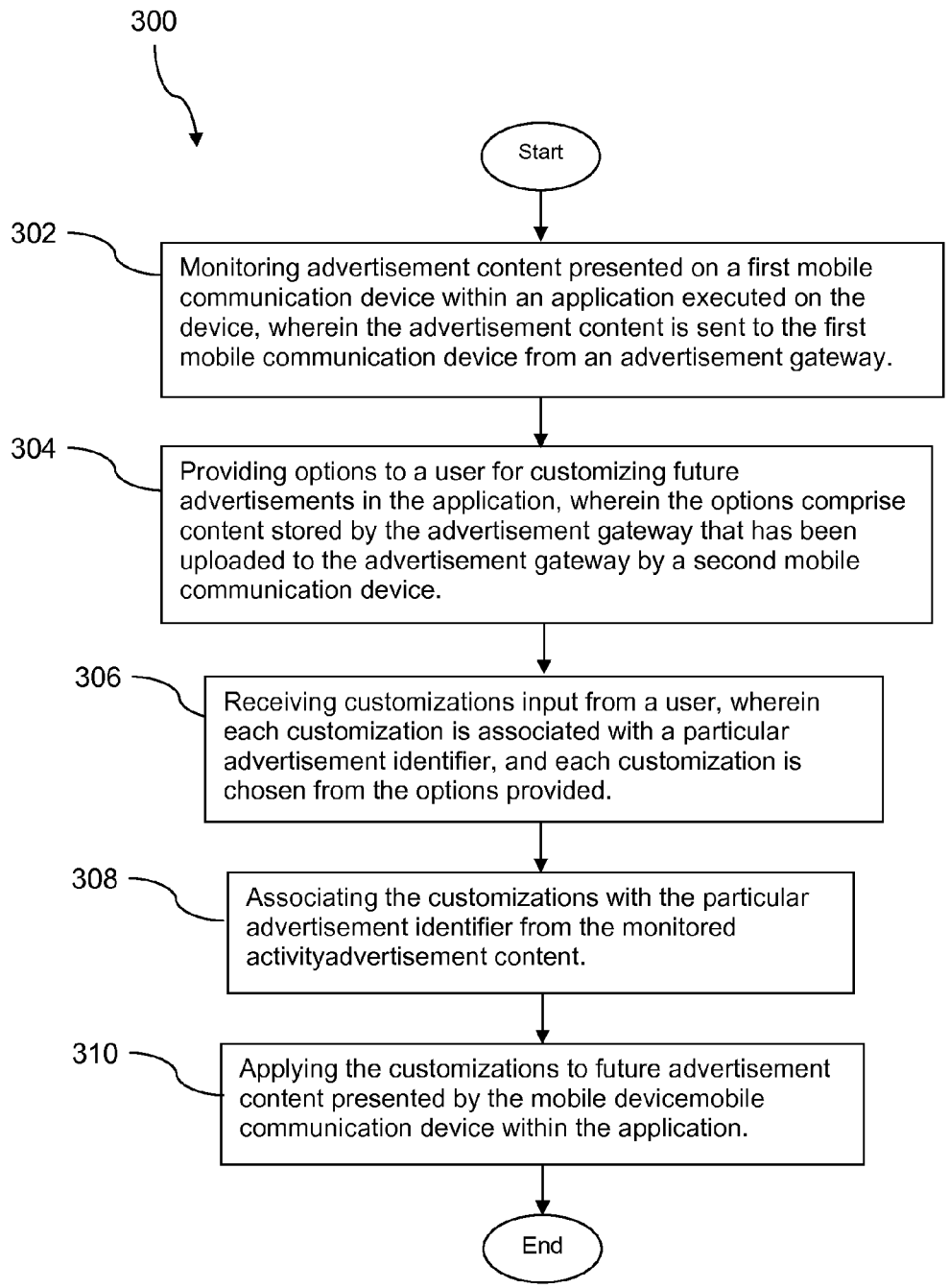
FIG. 3 is a flow chart illustrating another method according to an embodiment of the disclosure.

Turning now to FIG. 3, a method 300 for presenting advertisements on a mobile communication device is described. At block 302, advertisement content presented on a (first) mobile device within an application executed on the device may be monitored, wherein the advertisement content is sent to the (first) mobile device from an advertisement gateway. At block 304, options may be provided to a user for customizing future advertisements in the application, wherein the options comprise content stored by the advertisement gateway that has been uploaded to the advertisement gateway by a second mobile communication device. At block 306, customizations input from a user may be received, wherein each customization is associated with a particular advertisement identifier, and each customization is chosen from the options provided. At block 308, the customizations may be associated with the particular advertisement identifier from the monitored activity. At block 310, the customizations may be applied to future advertisement content presented by the mobile device within the application.

In some embodiments, the steps of the method 300 may be completed by a customization application executed on the mobile device. In some embodiments, the steps of the method 300 may be completed by the application in which the advertisement content is presented. In some embodiments, the steps of the method are completed by the advertisement gateway in communication with the mobile communication device. In some embodiments, the options may comprise content stored by the advertisement gateway that has been uploaded to the advertisement gateway by a plurality of mobile communication devices. In some embodiments, the content uploaded to the advertisement gateway may comprise images, videos, sounds, and other media.

For example, a user may upload personal content from their mobile device to the advertisement gateway, wherein the personal content may be associated with a particular advertisement or type of advertisement. The content may then be made available, by the advertisement gateway, to be presented in advertisements on other mobile devices. In one example, the advertisement gateway may utilize the uploaded content from one device in advertisements that are displayed on other devices, without any customization from the other devices. In another example, the advertisement gateway may present users with customization options that include content uploaded by other users, wherein when the options are chosen by a user of a first device, the content and/or customizations from a second device may then be implemented on the first device.

Figure 4:
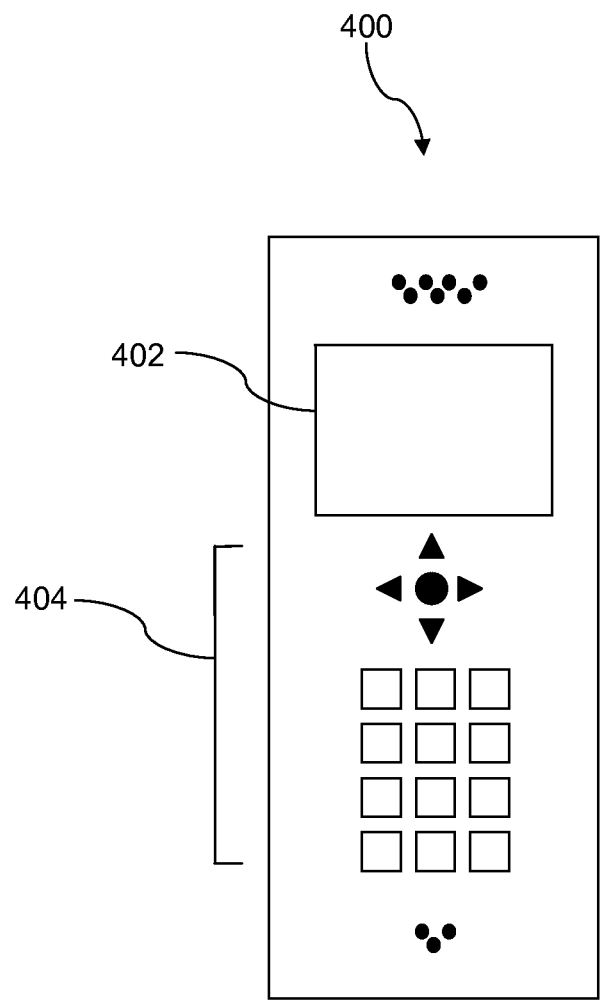
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
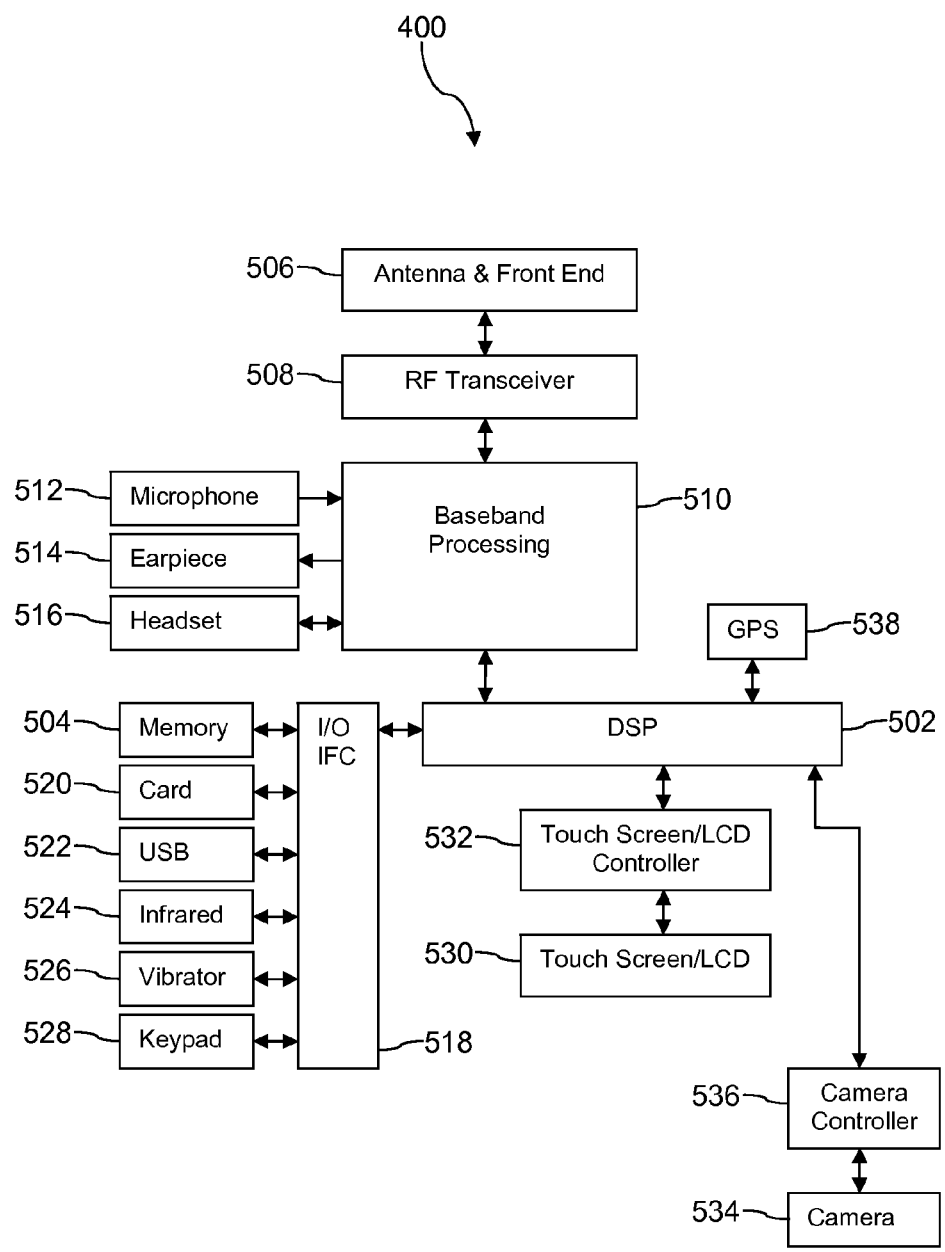
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
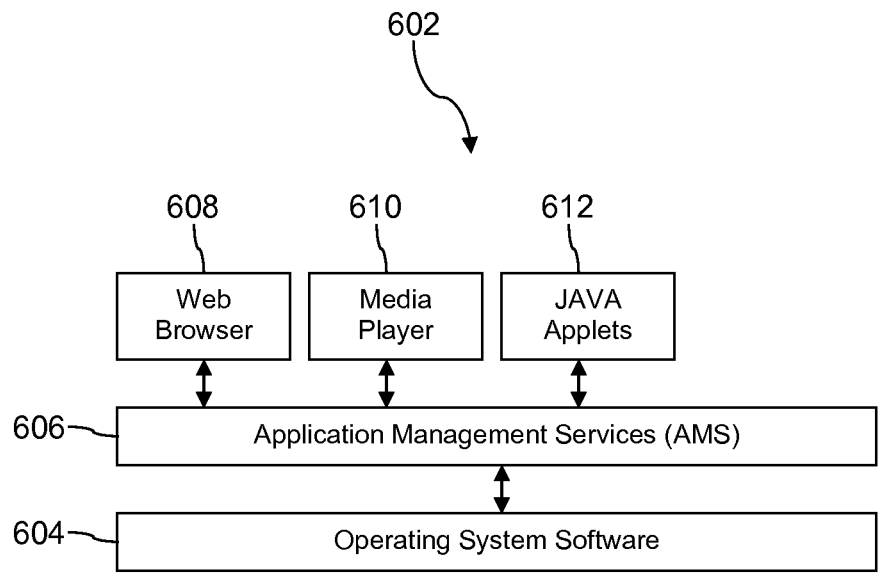
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
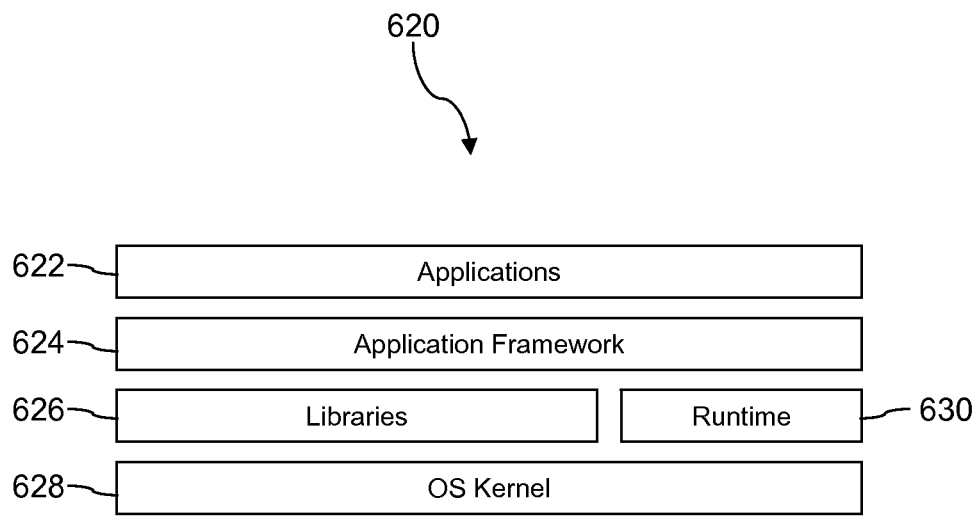
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
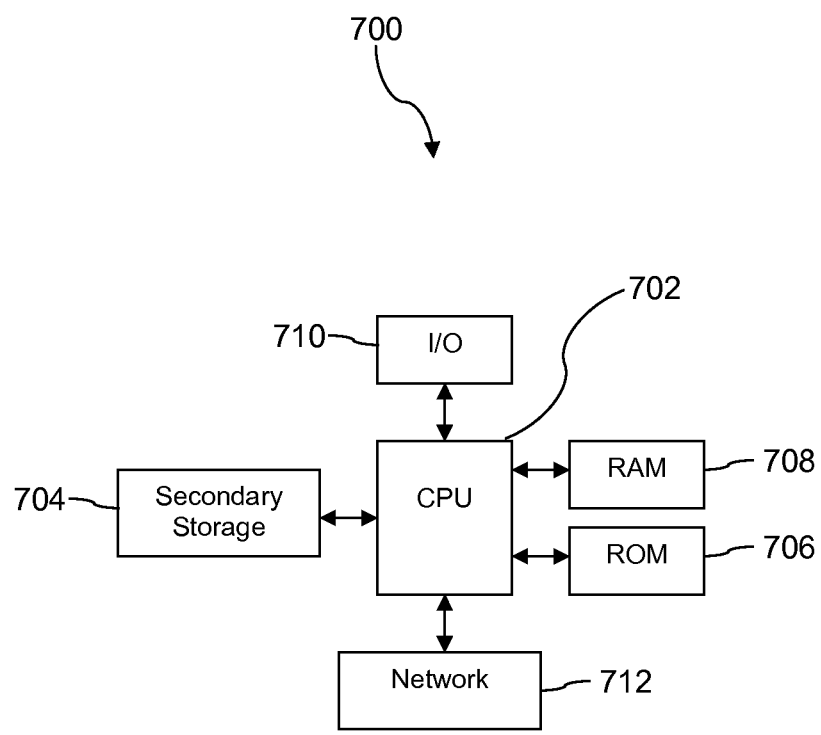
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for customizing content within an advertisement that is targeted for an advertisement space on a mobile communication device, the method comprising:

automatically monitoring identifiers associated with advertisement content presented in an advertisement space and delivered to the mobile communication device by an advertisement gateway remotely located and in communication with the mobile communication device, wherein the identifiers are included in a list of advertisement activity on the mobile communication device;

controlling, by the advertisement gateway, personal content that is uploaded from the mobile communication device into a non-transitory memory of a content data store;

providing, by the advertisement gateway, customization options to a user interface of the mobile communication device for customizing the advertisement content on the mobile communication device, wherein the customization options comprise an option corresponding to replacement of at least a portion of the advertisement content with the personal content stored on the content data store;

receiving a customizations input corresponding to at least one of the customization options via the user interface of the mobile communication device;

associating, by executing a customization application on the mobile device, the customizations input with a particular advertisement content from the monitored identifiers included in the list of advertisement activity and the personal content, wherein the particular advertisement content is targeted for the mobile communication device;

based on the associating, replacing, by executing the customization application on the mobile device, a portion of the particular advertisement content with the personal content that is stored by the advertisement gateway and presented at the advertising space on the mobile communication device; and applying the customizations input to subsequently delivered advertisement content received by the mobile communication device from the advertisement gateway, wherein the personal content comprises data captured by the mobile communication device and corresponding to images, videos, sounds, or any combination thereof.

2. The method of claim 1, wherein the method is completed by a customization application that configures a processor on the mobile communication device, wherein the application handles the distribution of advertisement content for a plurality of communication apps executed by the device.

3. The method of claim 1, wherein the method is completed by a communication application on the mobile communication device that presents advertisement content in the advertisement space.

4. The method of claim 1, wherein the method is completed by the advertisement gateway in communication with the mobile communication device.

5. The method of claim 1, wherein providing the customization options includes presentation of the list of advertisement activity.

6. The method of claim 1, wherein a user accesses the customization options by clicking a specific advertisement presented on the mobile communication device.

7. The method of claim 1, wherein the customization options are provided by the advertisement gateway.

8. The method of claim 1 further comprising uploading, from the mobile communication device, the personal content to the advertisement gateway.

9. The method of claim 8 further comprising associating the personal content that is uploaded to the advertisement gateway with one of the identifiers associated with advertisement content.

10. A method for customizing content within an advertisement that is targeted for an advertisement space on a mobile communication device, the method comprising:
    monitoring, by executing a customization tool that configures at least one processor, advertisement content presented on a first mobile communication device within an application executed on the first mobile communication device, wherein the advertisement content is sent to the first mobile communication device from an advertisement gateway;
    controlling, by the advertisement gateway, content that is uploaded from mobile communication devices into a non-transitory memory of a content data store;
    providing, from the advertisement gateway, customization options on a user interface of the first mobile communication device for customizing the advertisement content in the application, wherein the options correspond with content that has been uploaded to the advertisement gateway by a second mobile communication device to the content data store;
    receiving customizations input from the first mobile communication device via the user interface, wherein each customizations input is associated with an identifier for a type of advertisement, and each customization input is selected from the customization options provided;
    associating the identifier with a particular advertisement of the monitored advertisement content;
    replacing at least a portion of the particular advertisement content with the content from the second mobile communication device stored by the advertisement gateway for presentation at an advertisement space on the first mobile communication device; and
    applying the customizations input to subsequently delivered advertisement content presented by the first mobile communication device within the application at the advertisement space.

11. The method of claim 10, wherein the method is completed by executing a customization tool that configures a processor on the first mobile communication device.

12. The method of claim 11, wherein the application in which the advertisement content is presented comprises the customization tool.

13. The method of claim 10, wherein the customization tool is executed via the advertisement gateway in communication with the first mobile communication device.

14. The method of claim 10, wherein the options comprise content stored by the advertisement gateway that has been uploaded to the advertisement gateway by a plurality of mobile communication devices.

15. The method of claim 10, wherein the content uploaded to the advertisement gateway comprises images, videos, sounds, or any combination thereof.

16. A mobile communication device comprising:
    a non-transitory memory;
    a processor; and
    an application stored in the memory that, upon execution by the processor, configures at least the processor to:
        monitor identifiers associated with advertisement content presented in an advertisement space and delivered to the mobile communication device by an advertisement gateway in communication with the mobile communication device, wherein the identifiers are included in a list of advertisement activity on the mobile communication device,
        upload personal content to the advertisement gateway that stores and controls personal content,
        provide customization options to a user interface of the mobile communication device for customization of the advertisement content on the mobile communication device,
        receive customizations input corresponding to at least one of the customization options via the user interface,
        associate the customizations input with a particular advertisement content from the monitored identifiers included in the list of advertisement activity,
        in response to the association, partially replace a portion of the particular advertisement content that is presented in the advertisement space with personal content stored by the advertisement gateway, and
        applies the customizations input to subsequently delivered advertisement content received by the mobile communication device.

17. The device of claim 16, wherein the application comprises a custom advertisement application executed on the device.

18. The device of claim 16, wherein the application comprises a communication application executed on the device.

19. The device of claim 18, wherein the application comprises a customization tool.

20. The device of claim 16 further comprising the user interface operable to present the advertisement activity, present the customization options to a user, and allow the user to interact with the application and customizations options.

* * * * *